United States Patent [19]

Roberts

[11] 4,145,888
[45] Mar. 27, 1979

[54] COMBINED TURBOCHARGER AND ACCESSORY DRIVE

[75] Inventor: Richard W. Roberts, Lombard, Ill.

[73] Assignee: Borg-Warner Corporation, Chicago, Ill.

[21] Appl. No.: 808,222

[22] Filed: Jun. 20, 1977

[51] Int. Cl.² .............................................. F02B 37/04
[52] U.S. Cl. ..................................................... 60/608
[58] Field of Search ........................... 60/607, 608, 605

[56] References Cited

U.S. PATENT DOCUMENTS

| 2,149,785 | 3/1939 | Neugebauer | 60/608 |
| 2,397,941 | 4/1946 | Birkigt | 60/608 |
| 2,402,725 | 6/1946 | Birkigt | 60/608 |
| 3,603,079 | 9/1971 | Kickbusch | 60/608 |

FOREIGN PATENT DOCUMENTS 1237380  3/1967  Fed. Rep. of Germany ............. 60/607

Primary Examiner—Carlton R. Croyle
Assistant Examiner—Michael Koczo, Jr.
Attorney, Agent, or Firm—James A. Geppert

[57] ABSTRACT

The present invention combines an exhaust gas turbine, a supercharger and an accessory drive for an internal combustion engine in an automotive vehicle to provide instantly available maximum power for full throttle acceleration along with the recovery of energy from the exhaust gas to drive the engine accessories at a substantially constant speed independent of the engine speed.

16 Claims, 2 Drawing Figures

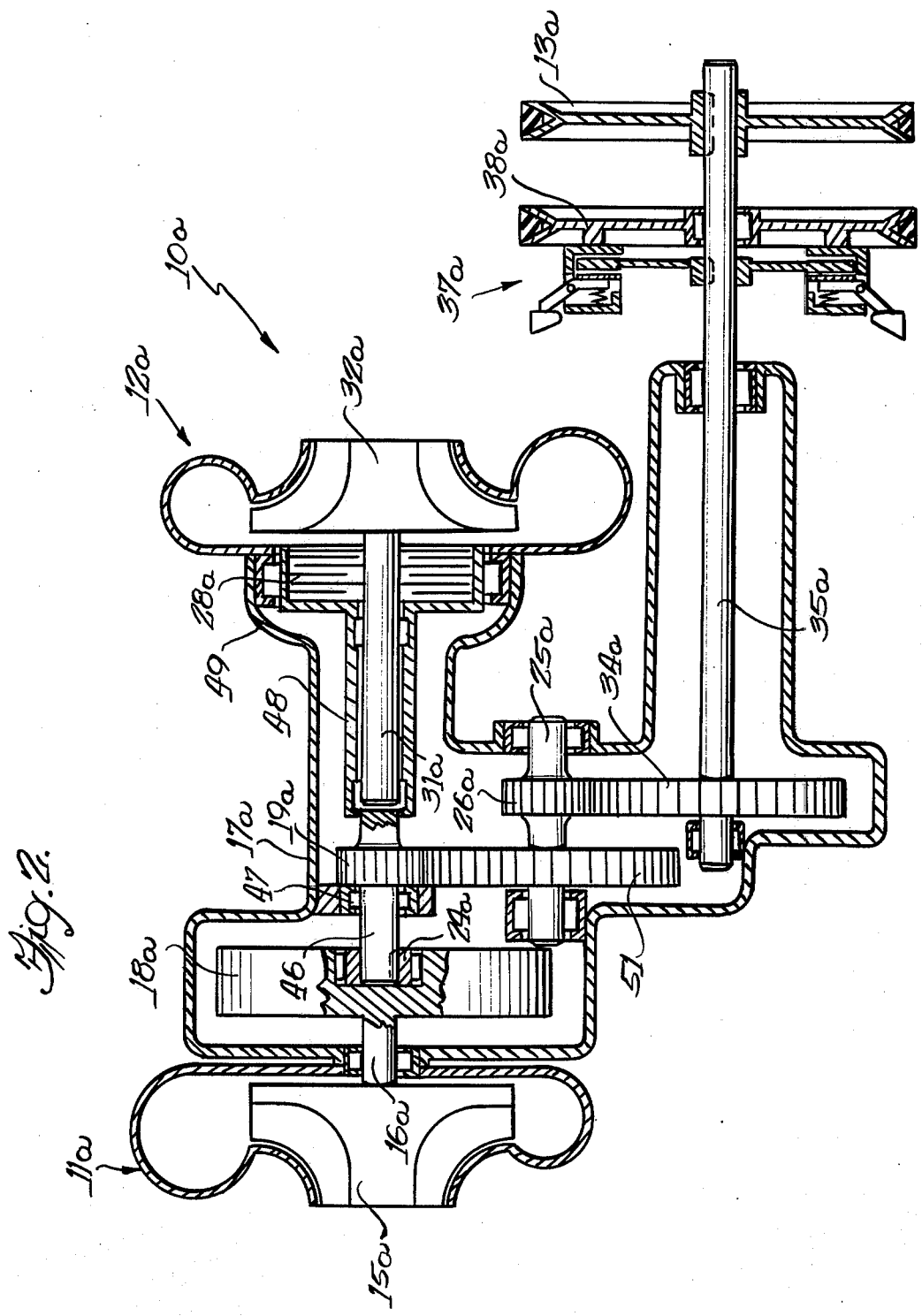

COMBINED TURBOCHARGER AND ACCESSORY DRIVE

BACKGROUND AND SUMMARY OF THE INVENTION

Exhaust gas turbochargers for internal combustion engines are known where the turbocharger is driven by the energy available in the exhaust gases of the engine. Such a turbocharger, in turn, supplies engine charge air to the internal combustion engine to which the turbocharger is connected. In an internal combustion engine, the exhaust energy is a function of the power output and therefore proportional to the engine speed for the full load fueling rate. Thus, at the lower end of the engine speed range, there is little energy in the exhaust gas and the power available to the turbocharger is low. The air supplied to the engine by the turbocharger is consequently low in quantity and pressure under these conditions.

The use of a turbocharger permits a smaller engine to deliver substantial horsepower at a considerable weight savings which will become increasingly attractive for future vehicles where gasoline economy is at a premium. A supercharger is only needed for maximum power for passenger vehicles, and thus, would be idle most of the time. At low engine speeds, the energy in the exhaust gases is insufficient to provide immediate acceleration of the turbocharger, and consequently of the vehicle.

With small lightweight cars for the future, the accessory power requirements will be a larger percentage of the power required to drive the vehicle. Accessory drives which will limit the upper speed of the accessories driven by the vehicle engine will achieve a power saving and are presently under consideration in the automotive industry. The present invention solves the problems of the vehicle accessory drive and acceleration of the vehicle from low speeds.

The present invention comprehends the provision of a combined exhaust gas turbine, supercharger and accessory drive for a vehicle engine which will utilize engine power to drive the supercharger for instant acceleration from low speeds, and will use the exhaust gas turbine to drive the vehicle accessories at substantially constant speed where sufficient energy is available from the turbine. At almost all times, there will be at least some energy return from the exhaust gas to help share the accessory load.

The present invention also comprehends the provision of a combined exhaust gas turbine, supercharger and accessory drive in conjunction with a vehicle engine wherein the exhaust gas turbine is mechanically connected to the supercharger through suitable gearing, a one-way clutch and a friction clutch. An accessory drive shaft is connected to an engine driven pulley through a centrifugally unloading clutch, and the accessory drive shaft is connected through an additional gear to the power transmission between the exhaust gas turbine and the supercharger. The one-way clutch prevents power from the engine to be used to accelerate the exhaust gas turbine.

The present invention further comprehends the provision of a combined exhaust gas turbine, supercharger and accessory drive wherein the drive from the exhaust gas turbine is split with part of the drive being imparted to the supercharger and part to the accessory drive. The exhaust gas turbine provides the power necessary to drive both the supercharger and the accessories at high engine power levels.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a schematic view of an alternate embodiment of the present invention.

DESCRIPTION OF THE PREFERRED EMBODIMENTS

Figure 1:
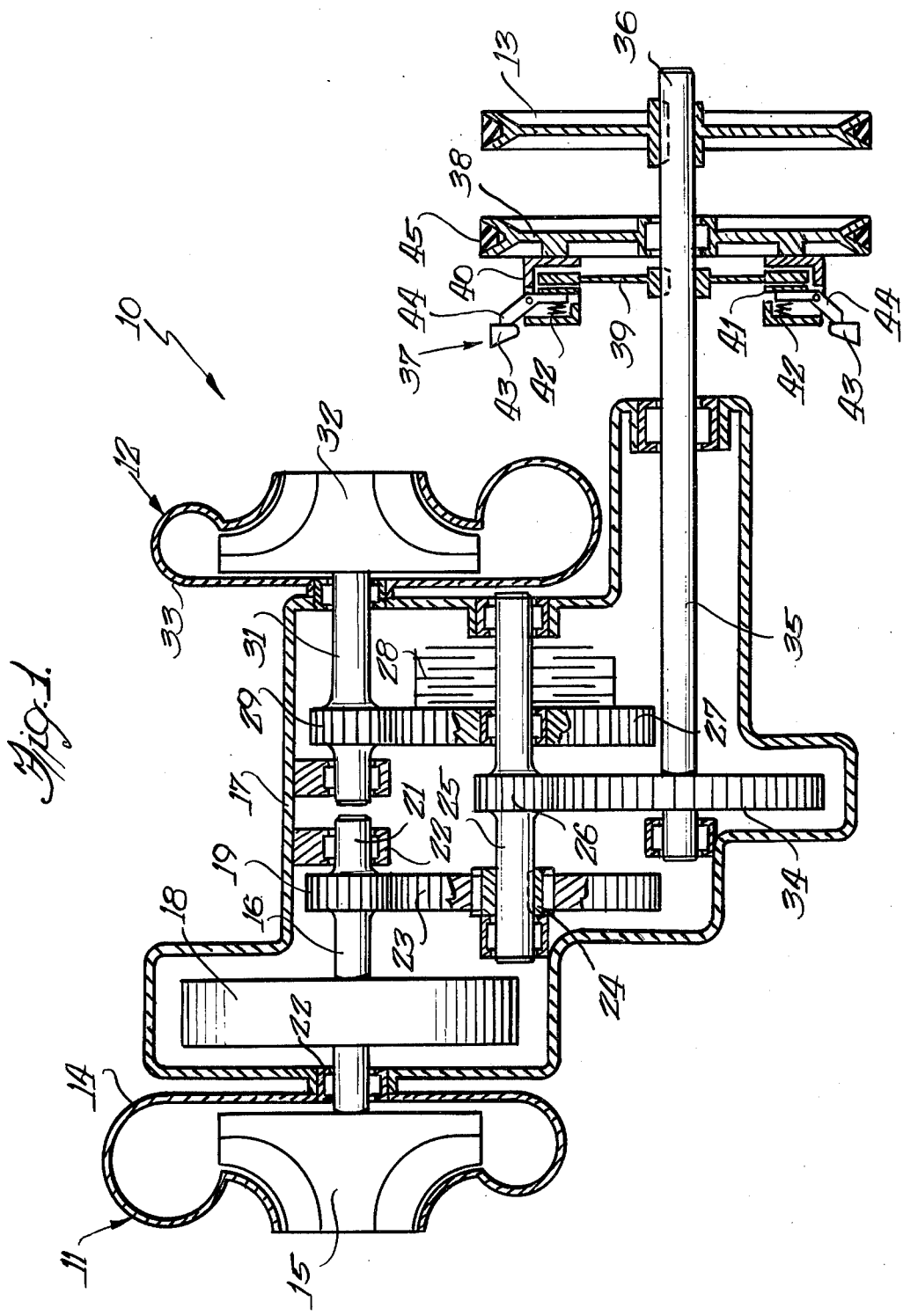
FIG. 1 is a schematic view of one embodiment of the present invention.

Referring more particularly to the disclosure in the drawings wherein are shown illustrative embodiments of the present invention, FIG. 1 discloses a schematic view of the assembly 10 of a combined exhaust gas turbine 11, supercharger 12 and an accessory drive pulley 13 to be suitably attached to an automotive vehicle internal combustion engine (not shown). The exhaust gas turbine 11 has a housing 14 with a rotor 15 mounted on a turbine shaft 16 extending into the housing 17 for the geartrain of this embodiment. A flywheel 18 is mounted intermediate the ends of the shaft 16 and a gear 19 is secured adjacent the free end 21 of the shaft mounted in suitable bearings 22.

A gear 23 meshes with the gear 19 and is operatively connected to a jackshaft 25 through a one-way clutch 24 of any suitable design. The jackshaft 25 has a gear 26 secured thereto intermediate its ends, and a gear 27 is journalled on the shaft 25 and operatively connected thereto through a multi-plate clutch 28. The gear 27 meshes with a gear 29 on an impeller shaft 31 carrying at its opposite end the impeller 32 of the supercharger 12; the impeller 32 rotating in a conventional housing 33.

A gear 34 meshes with the intermediate gear 26 and is mounted on an accessory drive shaft 35 which extends out of the housing 17 and has the accessory drive pulley 13 mounted for rotation thereon adjacent the free end 36. A centrifugally unloading clutch 37 is operatively connected between the shaft 35 and an engine drive pulley 38 journalled on the shaft 35 for rotation relative thereto. The centrifugally unloading clutch 37 includes an axially movable rotary clutch plate 39 splined onto the shaft 35, a rotary housing 40 encompassing the plate 39 and secured to the pulley 38, an axially movable friction plate 41 in the housing yieldably biased by springs 42 toward the plate 39, and a plurality of centrifugally-actuated weights 43 on the outer ends of arms 44 pivoted in the housing and operatively connected at their inner ends to the plate 42.

Under the design considerations for this assembly 10, the clutch units 24 and 28 are required to function at speeds of about 12,000 rpm., and the clutch 37 is designed to centrifugally unload at shaft speeds above 3000 rpm. Furthermore, the gearset 19,23 has a 4:1 ratio as have the gearsets 26,34 and 27,29. Therefore, utilizing these ratios, when the shaft 35 is rotating at 3000 rpm., the jackshaft 25 will be rotating at 12,000 rpm., and, without the one-way clutch 24, the shaft 16 would be rotating at 48,000 rpm. Likewise, the shaft 31 will have a rotation of 48,000 rpm. under these conditions. A conventional kick-down switch, actuated when the accelerator pedal is floored, controls actuation of the clutch 28.

When the engine (not shown) is idling, the clutch 37 is engaged, the clutch 28 is disengaged and the one-way clutch 24 is overrunning. The drive belt or chain 45 drives the pulley 38 from the engine crankshaft to rotate the accessory drive shaft 35 and the jackshaft 25 through the gearset 26,34. Also, the rotation of the shaft 35 causes rotation of the pulley 13 to drive the accessories from the engine. As the exhaust gas flow will be minimal at idling conditions, the turbine 11 does not rotate the shaft 16 at sufficient speed to cause engagement of the one-way clutch 24.

Under full power acceleration from low engine speeds, such as idling speed, the kick-down switch causes engagement of the clutch 28 to provide a power flow from the engine crankshaft through the belt 45 to input pulley 38, clutch 37, shaft 35, gearset 26,34, clutch 28, gearset 27,29 and impeller shaft 31 to the supercharger 12, wherein the supercharger supplies additional power for the engine, resulting in increased power output. Under these conditions, the one-way clutch 24 remains in overrunning condition and prevents any power from being used to accelerate the flywheel 18 and the turbine 11. As acceleration occurs, the exhaust gas flow increases to drive the rotor 15 at increasing speeds, so that a transition period will occur where the exhaust gas turbine takes up the load through the one-way clutch 24 to relieve the load on the belt drive 45.

When there is sufficient energy in the exhaust gases driving the rotor 15 resulting in sufficient rotor speed so that the one-way clutch 24 engages, the power flow is then from the turbine 11 and shaft 16, through the gearset 19,23 and one-way clutch 24, shaft 25, gearset 26,34 and shaft 35 to the accessory drive pulley 13 and, when needed, the supercharger 12. Whenever the speed of the shaft 35 exceeds 3000 rpm., the clutch 37 will be centrifugally disengaged so that the drive belt 45 from the engine has no effect on the accessory drive. Thus, the drive from the exhaust gas turbine 11 is split, with part of the power going to the supercharger and part to the accessory drive. When the vehicle reaches a steady state condition after acceleration is terminated, the clutch 28 will be disengaged so that the supercharger is then idled.

Depending on the speed of the engine, the exhaust gas turbine 11 may provide some or all of the power requirements for the accessories in the vehicle, and the rotor 15 may reach speeds greater than required for the accessory drive. To limit the speed of the drive pulley 13, a conventional waste gate control (not shown) is provided in front of the exhaust gas turbine 11 having a valve to by-pass any excess exhaust gas flow that would otherwise cause the rotor 15 to run at excessive speeds. The valve and by-pass will provide sufficient exhaust gas to effect a fixed speed of the turbine and hold the accessory drive shaft 35 to an upper limit for speed (such as 3000 rpm.) whenever the power input for the accessory drive pulley 13 is totally from the turbine.

Now considering the alternate embodiment shown in FIG. 2, this embodiment utilizes fewer components but requires the clutches to operate at speeds of approximately 48,000 rpm. Components of this embodiment identical to those of the embodiments of FIG. 1 will have the same reference numeral with the addition of a script a. This assembly 10a includes the combination of an exhaust gas turbine 11a, a supercharger 12a and an accessory drive pulley 13a. The rotor 15a of the turbine 11a drives a turbine shaft 16a having a flywheel 18a secured thereto. A one-way clutch 24a is located between the flywheel 18a and a second axially aligned shaft 46 rotatably mounted in bearing 47 and terminating at its opposite end in an enlarged sleeve 48 operatively connected to one portion of the multiplate clutch 28a. The clutch 28a is mounted in an enlargement 49 of the gear housing 17a directly adjacent to the supercharger 12a.

The shaft 31a for the impeller 32a of the supercharger 12a is concentrically located within the sleeve 48 and in axial alignment with the shaft 46. A gear 19a is secured onto the shaft 46 intermediate its ends and meshes with a gear 51 on the jackshaft 25a. A second gear 26a on the shaft 25a meshes with gear 34a on the accessory drive shaft 35a. Outside the housing 17a, the shaft 35a carries a centrifugally unloading clutch 37a for operative engagement between the shaft 35a and the engine drive pulley 38a journalled thereon.

With the speed of the shaft 35a at 3000 rpm., the shaft 25a driven through the gearset 26a,34a rotates at a speed of 12,000 rpm., wherein the gearset ratio is 4:1. The ratio of the gearset 19a,51 is also 4:1 so that the shaft 46 is driven at a speed of 48,000 rpm. Thus, the transition wherein the turbine will fully drive the accessory drive pulley is 3000 rpm. for the shaft 35a and/or 48,000 rpm. for the rotor 15a of the exhaust gas turbine 11a. Aside from the difference in the speed ratios of the various shafts and the operating speed ranges for the clutches 24a and 28a, the functioning of this embodiment is identical with the embodiment of FIG. 1.

I claim:

1. In combination with an internal combustion engine, an exhaust gas turbine, a supercharger and an accessory drive shaft, means to connect the engine crankshaft to the accessory drive shaft including a centrifugally unloading clutch on the accessory drive shaft and an engine drive pulley forming part of the centrifugally unloading clutch and journalled on the accessory drive shaft, a gear train interconnecting said turbine, supercharger and accessory drive shaft, and clutch means to alternately connect the turbine or the accessory drive shaft with the supercharger.

2. The combination as set forth in claim 1, in which said geartrain includes a turbine shaft, an impeller shaft and a jackshaft, said jackshaft being operatively connected to the turbine shaft, the impeller shaft and the accessory drive shaft.

3. The combination as set forth in claim 2, in which said clutch means allows said supercharger to be alternately driven by the engine crankshaft or the exhaust gas turbine.

4. The combination as set forth in claim 2, in which said clutch means includes a one-way clutch located between said turbine shaft and said jackshaft.

5. In combination with an internal combustion engine, an exhaust gas turbine, a supercharger and an accessory drive shaft, means to connect the engine crankshaft to the accessory drive shaft, a gear train interconnecting said turbine, supercharger and accessory drive shaft including a turbine shaft, an impeller shaft and a jackshaft, said jackshaft being operatively connected to the turbine shaft, the impeller shaft and the accessory drive shaft, and clutch means to alternately connect the turbine or the accessory drive shaft with the supercharger including a clutch between said jackshaft and said impeller shaft, and means to actuate said clutch under full acceleration of the vehicle engine.

6. In combination with an internal combustion engine, an exhaust gas turbine, a supercharger and an accessory drive shaft, means to connect the engine crankshaft to the accessory drive shaft, a gear train interconnecting said turbine, supercharger and accessory drive shaft including a turbine shaft and an impeller shaft in substantial axial alignment and a jackshaft, a first gearset between said turbine shaft and said jackshaft, a second gearset between said jackshaft and said accessory drive shaft, and clutch means to alternately connect the turbine or the accessory drive shaft with the supercharger including a clutch interposed between said jackshaft and said impeller shaft.

7. The combination as set forth in claim 6, in which said clutch means includes a one-way clutch interposed between said first gearset and said jackshaft which will overrun when said jackshaft speed is greater than said turbine speed.

8. The combination as set forth in claim 7, including a third gearset between said jackshaft and said impeller shaft, and said first mentioned clutch is interposed between said jackshaft and said third gearset.

9. The combination as set forth in claim 8, in which said connecting means includes a centrifugally unloading clutch on the accessory drive shaft, and an engine drive pulley forming part of said centrifugally unloading clutch and journalled on said accessory drive shaft.

10. The combination as set forth in claim 6, including an intermediate shaft in axial alignment with said turbine and impeller shafts, one end of said intermediate shaft being connected to said first gearset and the opposite end being formed as a sleeve receiving and concentric with said impeller shaft, and said clutch is interposed between said sleeve and said impeller shaft.

11. The combination as set forth in claim 10, including a flywheel mounted on the inner end of said turbine shaft, and said clutch means includes a one-way clutch between said flywheel and said intermediate shaft.

12. The combination as set forth in claim 11, in which said connecting means includes a centrifugally unloading clutch on the accessory drive shaft, and an engine drive pulley forming part of said centrifugally unloading clutch and journalled on the accessory drive shaft.

13. In combination with an internal combustion engine, an exhaust gas turbine, a supercharger and an accessory drive shaft, means to connect the engine crankshaft to the accessory drive shaft, a gear train interconnecting said turbine, supercharger and accessory drive shaft, and clutch means to alternately connect the turbine or the accessory drive shaft with the supercharger, said gear train including a turbine shaft, an axially aligned impeller shaft, and a jackshaft, a gearset between said turbine shaft and said jackshaft, a second gearset between said jackshaft and said accessory drive shaft, and a third gearset between said jackshaft and said impeller shaft, said clutch means including a one-way clutch between the first gearset and the jackshaft and a second clutch between the jackshaft and the third gearset, and said connecting means comprises a centrifugally unloading clutch on the accessory drive shaft, and an engine drive pulley forming part of the centrifugally unloading clutch and journalled on the accessory drive shaft.

14. The combination as set forth in claim 13, including a flywheel mounted on said turbine shaft, said centrifugally unloading clutch allowing the supercharger to be alternately driven by the engine drive pulley or the exhaust gas turbine under conditions of acceleration of the engine.

15. In combination with an internal combustion engine, an exhaust gas turbine, a supercharger and an accessory drive shaft, means to connect the engine crankshaft to the accessory drive shaft, a gear train interconnecting said turbine, supercharger and accessory drive shaft, and clutch means to alternately connect the turbine or the accessory drive shaft with the supercharger, said gear train including a turbine shaft, an axially aligned impeller shaft, and a jackshaft, a flywheel on said turbine shaft, an intermediate shaft axially aligned with said turbine shaft and terminating in a sleeve shaft concentric with and receiving said impeller shaft, a first gearset between said intermediate shaft and jackshaft, a second gearset between said jackshaft and accessory drive shaft, said clutch means including a one-way clutch located between the flywheel and the intermediate shaft and a second clutch located between the sleeve shaft and the impeller shaft, and said connecting means comprising a centrifugally unloading clutch on the accessory drive shaft and an engine drive pulley forming part of the centrifugally unloading clutch and journalled on the accessory drive shaft.

16. The combination as set forth in claim 15, including means to actuate said second clutch under full acceleration of the vehicle engine, and said centrifugally unloading clutch allows the supercharger to be alternately driven by said engine drive pulley or the exhaust gas turbine.

* * * * *